Figure 1:
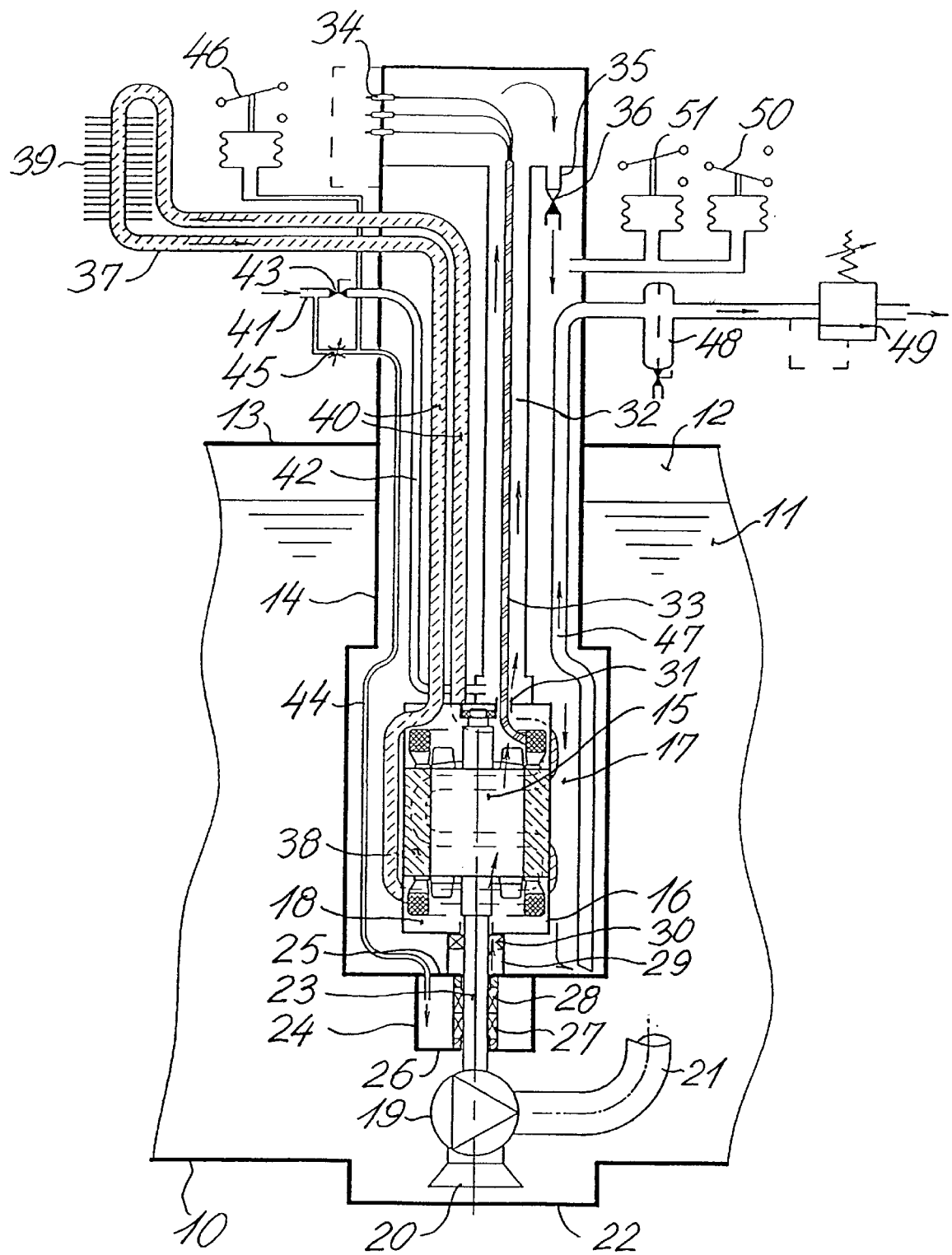

United States Patent [19]
Halkjær

[11] Patent Number: 6,086,331
[45] Date of Patent: Jul. 11, 2000

[54] SAFETY PUMPING SYSTEM FOR HAZARDOUS ENVIRONMENTS USING PRESSURIZED GAS IN A PLURALITY OF CHAMBERS

[75] Inventor: Lau Halkjær, Aalborg, Denmark

[73] Assignee: Svanehoj International A/S, Svenstrup, Denmark

[21] Appl. No.: 08/945,148

[22] PCT Filed: Apr. 23, 1996

[86] PCT No.: PCT/DK96/00183

§ 371 Date: Oct. 17, 1997

§ 102(e) Date: Oct. 17, 1997

[87] PCT Pub. No.: WO96/34206

PCT Pub. Date: Oct. 31, 1996

[30]    Foreign Application Priority Data

Apr. 24, 1995 [DK] Denmark .................... 0478/95

[51] Int. Cl.[7] .................................... F04B 49/10
[52] U.S. Cl. .................. 417/9; 417/44.1; 417/13; 417/423.3; 417/423.11; 417/372
[58] Field of Search ................ 417/414, 422, 417/44.1, 9, 13, 423.3, 423.11, 372

[56]    References Cited

U.S. PATENT DOCUMENTS

| | | | |
|---|---|---|---|
| 4,087,204 | 5/1978 | Niedermeyer | 417/2 |
| 5,336,064 | 8/1994 | Lamers | 417/423.3 |

FOREIGN PATENT DOCUMENTS

| | | |
|---|---|---|
| 1054339 | 9/1991 | China . |
| 0043162 | 1/1982 | European Pat. Off. . |
| 0424206 | 4/1991 | European Pat. Off. . |
| 794872 | 2/1936 | France . |
| 3426409 | 6/1985 | Germany . |
| 95/16299 | 6/1995 | WIPO . |

*Primary Examiner*—Timothy S. Thorpe
*Assistant Examiner*—Daniel E. Moses
*Attorney, Agent, or Firm*—Merchant, Gould, Smith, Edell, Welter & Schmidt

[57]    ABSTRACT

A safety pumping system including a pump (19) and an electric motor (15) is adapted to be immersed in a fluid (11) contained in a tank (10). The electric motor and the pump are interconnected by a driving shaft (23). The electric motor is enclosed in a motor housing, which defines an inner space (18). The motor housing is surrounded by an outer shell or jacket (14), which defines an outer space (17) between the outer shell and the motor housing. In order to reduce the risk of explosions when the pumping system is immersed in an inflammable liquid, protective gas, such as nitrogen, at a superatmospheric pressure is supplied to the inner space (18) of the motor housing (15). Protective gas is also supplied to the outer space (17) defined by the outer shell of jacket (14). The gas pressure within the inner space (18) preferably exceeds the gas pressure within the outer space (17), which preferably exceeds the atmospheric pressure. The two separate zones of protective gas substantially reduce the risk of explosions due to overheating or generation of electrical sparks.

31 Claims, 3 Drawing Sheets

SAFETY PUMPING SYSTEM FOR HAZARDOUS ENVIRONMENTS USING PRESSURIZED GAS IN A PLURALITY OF CHAMBERS

The present invention relates to a safety pumping system which includes a pump and an electric motor, and which is adapted to be immersed in a fluid contained in a tank various inflammable fluids, such as liquid petroleum products, liquified gases and various hazardous chemical liquid products are usually stored in large tanks, for example in tankers when the liquid is transported, or in stationary tanks on land. The inflammable liquid may be delivered to and/or discharged from such tanks by means of pumps, such as special centrifugal pumps. Such deep well pumps, which are located adjacent to the bottom of the tank, may be driven by an electric motor provided that the motor is of an explosion proof design and positioned above the top wall of the tank. A long driving shaft may then extend from the motor, through the well and down to the pump. Such long driving shaft requires a large number of bearings, and on board of a ship a high positioning of several such rather heavy electric motors contributes to instability because the center of gravity is being moved upwardly.

Another possibility is to use a hydraulic motor for driving the pump. Because such hydraulic pump does not contain any source of ignition it may be arranged within the tank close to the pump. However, such hydraulic pump is disadvantageous because it needs a supply of high pressure oil via a complicated hydraulic supply system. Furthermore, driving oil leaking from the hydraulic system may penetrate into the tank and contaminate the fluid contained therein.

A safety pumping system of the above type allowing the use of an electric driving motor positioned within the tank close to the pump is disclosed in U.S. Pat. No. 5,336,064. A motor housing surrounding the driving motor defines an inner space and is surrounded by an outer shell. The motor housing contains a non-hazardous liquid, such as oil, that displaces oxygen in the inner space of the motor housing so that explosions due to an electric spark caused by failure of the electric motor are resisted. The outer space defined between the motor housing and the outer shell is filled with an inert atmosphere so as to isolate the electric motor from the hazardous liquid in the surrounding space of the tank.

In this known pumping system the liquid contained in the inner space of the motor housing is used for cooling the motor and for lubricating and cooling bearings and seals. However, the use of two different fluids, namely a liquid in the inner space of the motor housing and an inert gas in the space defined between the motor housing and the outer shell, substantially complicates the pumping system and involves the risk of contamination of the fluid within the tank with oil or another liquid leaking from the inner space of the motor housing.

The present invention provides a pumping system of the type described above in which only one fluid, namely a protective gas, is needed for obtaining an explosion proof immersed pumping system with an electric driving motor.

Thus, the present invention provides a safety pumping system, which includes a pump and an electric motor, and which is adapted to be immersed in a fluid contained in a tank, said system comprising a motor housing enclosing the electric motor, an outer shell or jacket defining an outer space surrounding the housing of the motor, a driving shaft interconnecting the electric motor and the pump, and first gas supply means for supplying protective gas into the outer space at a pressure exceeding the atmospheric pressure, so as to fill the outer space with such gas, and the pumping system according to the invention is characterized in that the motor housing defines an inner space containing the electric motor, second gas supply means being provided for supplying protective gas into the inner space so as displace oxygen therefrom and fill the space with protective gas in order to counteract explosions, the second gas supply means being adapted to maintain the protective gas in the inner space at a pressure, which is equal to or exceeds that of the gas pressure in the outer space. This means that the electric motor is isolated from the tank content by two separate atmospheres of protective gas. The risk of explosion is further reduced when the protective gas in the inner space of the motor housing is maintained at a pressure exceeding that of the gas pressure in the outer space. Thereby it is counteracted that inflammable fluid from the tank which might have leaked into the outer space, may continue into the inner space defined by the motor housing.

Furthermore, in order to reduce the risk that fluid, such as an inflammable liquid, leaks from the tank into the outer space defined by the outer shell, the first gas supply means may be adapted to maintain the protective gas in the outer space at a pressure exceeding at least the pressure of a gas phase in the tank and possibly also the maximum pressure of the fluid in the tank adjacent to the outer shell or jacket. As an example, the pressure of the protective gas within the inner space of the motor housing may be maintained at a pressure which is 1.5–3 bar higher than the pressure of a gas phase within the tank at the outer surface of the outer shell. The pressure within the outer space may, for example, be 0.02–0.5 bar lower than in the inner space.

Because the pump is arranged outside the outer shell or jacket the driving shaft extends through aligned openings defined in the motor housing and in the outer shell, respectively. Said first and second gas supply means may be adapted to supply protective gas directly into the outer space and into the inner space, respectively. Because the pressures of the protective gas in said spaces exceed the pressure of the fluid within the tank, such fluid is prevented from leaking into the outer shell or jacket where the shaft is passed through the wall of the outer shell. However, in order to reduce the consumption of protective gas a seal is preferably arranged around the driving shaft where the shaft is passed through the aligned openings in the motor housing and in the outer shell, respectively. In the preferred embodiment, however, the outer shell or jacket defines a separate sealing chamber located between said outer space and the fluid contained in the tank, the driving shaft extending through aligned openings formed in opposite shell wall parts defining the sealing chamber, and third gas supply means being provided for supplying protective gas to the sealing chamber so as to maintain a pressure therein exceeding the pressure of the fluid in the adjacent part of the tank.

The gas pressure within the inner space of the motor housing preferably exceeds the gas pressure within the sealing chamber. This means that protective gas will tend to leak from the inner space into the sealing chamber and from the sealing chamber into the tank where the protective inert gas will usually not cause any contamination of the tank content. In order to reduce the leakage of protective gas from the sealing chamber into the tank to a minimum, the sealing chamber preferably contains sealing means surrounding the shaft for sealing at least one of the openings through which the driving shaft extends outwardly from the outer space. Such sealing means is usually arranged stationary within the sealing chamber and is at the same time in contact with the rotating shaft. The friction between the sealing means and the peripheral surface of the shaft generates heat. However, the small amount of protective gas leaking past the sealing means or sealing ring substantially reduces the friction of forces between the sealing means and the shaft and cools the sealing means, whereby the operative life of the sealing means is considerably prolonged.

As mentioned above, the first and second gas supply means may independently supply protective gas directly into the outer and inner spaces, respectively, and the third gas supply means may supply protective gas directly into the sealing chamber. Alternatively, the first gas supply means may comprise said second gas supply means, which means that the protective gas is supplied to said outer space via the inner space of the motor housing. Similarly, the second gas supply means may comprise said first gas supply means, so that protective gas is supplied to the inner space of the motor housing via the sealing chamber. However, this structure involves the risk that tank content which might have leaked into the sealing chamber is passed into the inner space of the motor housing. In order to reduce the risk that fluid from the tank is passed into the inner space, the third gas supply means preferably comprises said second gas supply means, which means that protective gas is supplied to the sealing chamber via said inner space of the motor housing.

When the protective gas is supplied to the outer space via the inner space of the motor housing these spaces may be interconnected by a one-way valve allowing the protective gas to flow only from the inner space into the outer space. Such one-way valve opens when a predetermined pressure difference, for example 0.02–0.5 bar, has been obtained between the inner and outer spaces. In this manner it may be secured that the gas pressure within the inner space of the motor housing is maintained at a higher value than the gas pressure within the outer space. Similarly, a one-way valve may interconnect the inner space of the motor housing and the sealing chamber so that protective gas may flow from the inner space into the sealing chamber, only. Thereby the desired higher pressure within the inner space may be maintained as explained above.

The operation of the electric motor and preferably also the supply of protective gas to the inner space, to the outer space, and/or to the sealing chamber may be controlled by a control circuit, such as an electrical or electronic control circuit.

A too high consumption of protective gas indicates an unacceptable gas leak, for example because the gas sealing means for sealing around the driving shaft has been worn out or otherwise has become inefficient. Such a situation may involve a risk of gas pressure drop within the inner and/or outer space, whereby a dangerous situation may occur. The pumping system according to the invention may comprise means for sensing the volume flow of protective gas being supplied to any of the inner and outer spaces and/or to the sealing chamber and means for causing the control circuit to activate an alarm and/or to interrupt the power supply to the electric motor when said gas volume flow exceeds a predetermined limit.

The gas phase above the liquid fluid in the tank is usually kept under a pressure being close to atmospheric pressure. The pressure within the outer space should preferably exceed the pressure within the tank, but should preferably not be higher than necessary. Therefore, the first gas supply means may be adapted to supply protective gas to said outer space at a pressure exceeding the atmospheric pressure by less than one bar, preferably less than 0.4 bar.

The motor housing may have a gas inlet and a gas outlet, the gas inlet being connected to a gas-lubricated mechanical seal arranged on the driving shaft in a sealing chamber separated from said outer space, means being provided for supplying protective gas to the sealing chamber at a pressure exceeding the atmospheric pressure and being equal to or greater than the superatmospheric pressure in said outer space. Several inlets and outlets may be provided in the motor housing. Compared to liquid lubricated seals gas-lubricated seals have the advantage that a lubricant, which does not contaminate the fluid in the tank, may be chosen.

A further gas-lubricated mechanical seal may be arranged around the driving shaft where the shaft extends through a sealing chamber wall into the space of the tank, protective gas at superatmospheric pressure being supplied to said further seal from said sealing chamber. Said further seal seals in an area located between the motor and the pump. The temperature of a gas-lubricated seal of the type concerned increases only slightly in case of lacking lubrication, and the operational life time may be up to ten times longer than for liquid lubricated seals.

Said outer space may extend above the upper level of the fluid of said tank, the gas outlet of the motor housing being connected to said outer space above said upper level via a passage. Even if the outer space has been filled with fluid from the tank due to a leakage, this fluid cannot penetrate into the inner space of the motor housing. The gas outlet of the motor housing may be connected to said outer space via a one-way valve.

A power supply cable for the electric motor may extend through said passage, which is gas tight. Thereby the risk of explosion due to a cable defect may be reduced.

The system according to the invention may further comprise a liquid cooling system including a heat exchanger arranged outside the tank. By such cooling system it may be secured that the temperature of the electric motor is kept below a predetermined critical value at which the fluid or fluid vapour in the tank may explode. The heat exchanger which is located outside the tank may be a liquid/air exchanger or a liquid/seawater exchanger.

The liquid may be circulated within the cooling system by differences in the specific gravity of the liquid caused by thermal differences or by a circulating pump. By using such natural circulation of the heat transferring liquid the operation of the cooling system is not dependent on a circulating pump. The cooling system or cooling circuit may comprise a heating coil surrounding the electric motor means. Preferably, however, the cooling system comprises a cooling jacket formed by the motor housing.

Any of the superatmospheric pressures within the inner and outer spaces and within the sealing chamber may be maintained within a predetermined range between minimum and maximum values by a pair of pressure switches, which are adapted to output a signal to the control circuit when said pressure decreases below the minimum pressure and exceeds the maximum pressure, respectively. The signal transmitted to the control circuit may actuate one or more alarm functions and/or automatically initiate control of proper emergency functions of the pumping system.

In order to allow flushing of the inner space of the motor housing with protective gas prior to starting the motor the pumping system may comprise gas inlet means for supplying protective gas into the inner space of the motor housing at a superatmospheric pressure exceeding said maximum pressure.

The pumping system may further comprise a riser tube opening into said outer space at a level below the electric motor and extending upwardly therefrom to a pressure relief valve positioned above the upper level of the fluid in the tank. In case fluid has leaked into the outer space from the inner of the tank the leaking fluid may be discharged through the riser tube. Furthermore, the pressure relief valve may control the maximum pressure of the protective gas during normal operation. In such case the pressure level at which the pressure relief valve opens is preferably lower than the maximum pressure at which one of the above pressure switches is operated.

When the control circuit receives a signal from one of the pressure switches indicating that the pressure in said outer space exceeds said maximum pressure, the control circuit may shift into an alarm mode, which may be terminated only when protective gas at a pressure exceeding said maximum pressure has been supplied directly to the outer space or to the inner space of the motor housing. In case fluid is leaking from the tank into the outer space, the fluid will rise in the riser tube. If fluid from the tank continues to flow into the outer space the pressure in the outer space will eventually exceed the maximum value and cause the control circuit to shift into the alarm mode. Such alarm mode may involve activation of visual and auditive alarms and may possibly also cause termination of power supply to the electric motor. The state of alarm will be terminated only when protective gas under a high pressure has been supplied manually or automatically for expelling of the leaked fluid from the outer space through the riser tube.

The maximum pressure is preferably within the range of 0.25–0.4 bar above atmospheric pressure, while the minimum pressure may be at least 0.1 bar and preferably 0.2 bar above atmospheric pressure. These values have been chosen in view of the fact that the pressure within the outer space should somewhat exceed the gas pressure above the liquid fluid within the tank, which gas pressure may correspond to the atmospheric pressure or be somewhat higher. On the other hand the pressure within the motor housing and/or within the outer shell or jacket should preferably not necessitate special measures to enable the motor housing and the outer shell to resist such superatmospheric pressure.

The control circuit may shift into an alarm mode, in which the power supply to the electric motor is interrupted when receiving a signal from one of the pressure switches indicating that the pressure in said outer space is lower than said minimum pressure, the alarm mode being terminated only when the control circuit for a predetermined period of time has constantly been receiving a signal from the other of said pressure switches indicating that the pressure in said outer space exceeds said maximum value. If the pressure within the outer space becomes lower than the minimum pressure, for example because the inner space of the tank above the liquid level is communicating with the outer space via a leak, there is a risk that inflammable or hazardous gases penetrate into the outer space. In such case the power supply to the electric motor is stopped, whereby the risk of explosion is eliminated. Because the alarm mode is terminated only when the control circuit for a predetermined period of time has constantly been receiving a signal from the other of the pressure switches, it is secured that the total volume of the outer space may be flushed with protective gas so that dangerous gases may be removed prior to reestablishing the normal operational mode.

The protective gas used in the pumping system according to the invention is preferably nitrogen or another inert gas. An alternative may be gas which has been combusted or another gas low in oxygen.

Figure 2:
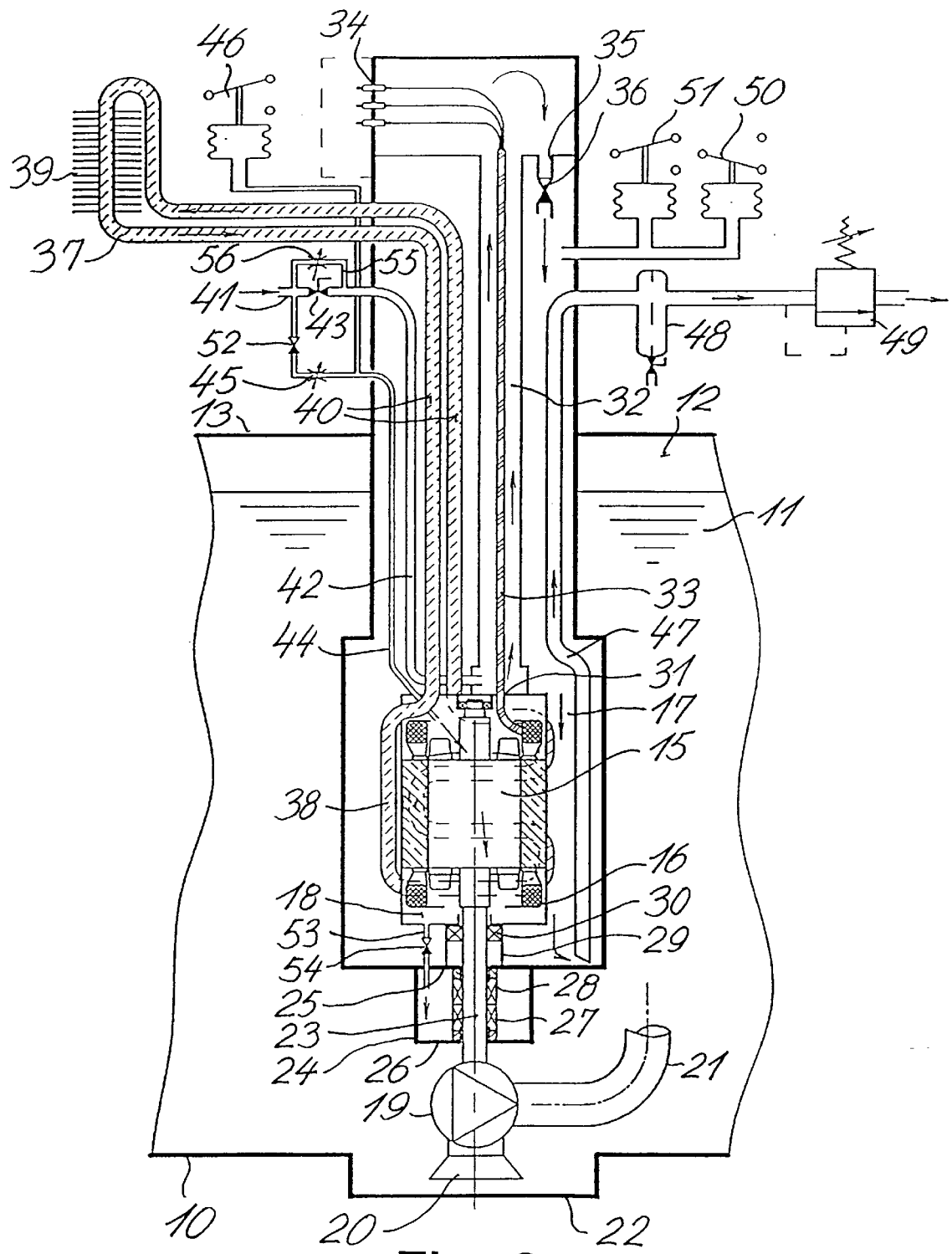
Figure 3:
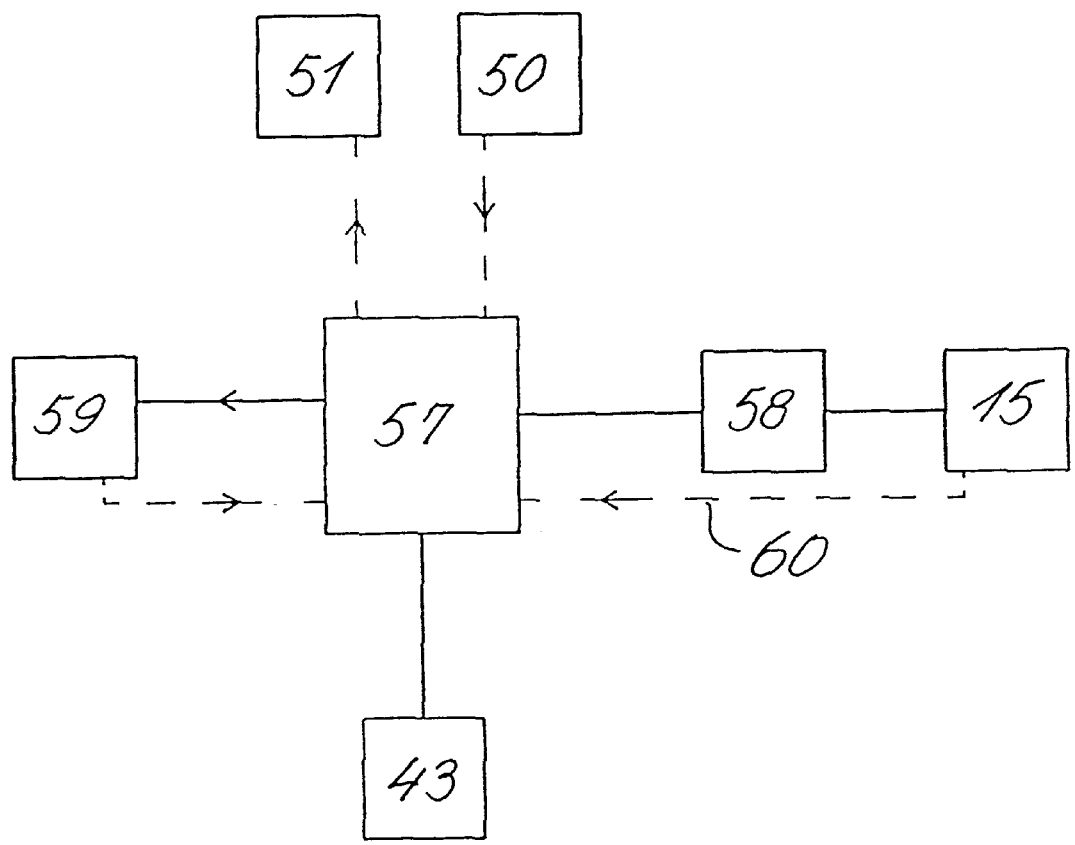

The invention will now be further described with reference to the drawings, wherein FIG. 1 diagrammatically illustrates a sectional view of a first embodiment of the pumping system according to the invention arranged in a tank, for example a tank installed in a ship or another vessel, FIG. 2 illustrates a modified embodiment of the pumping system according to the invention, and FIG. 3 is a diagram illustrating control of the pumping system according to the invention by means of a control circuit.

FIGS. 1 and 2 show a tank or container tank, which contains a liquid 11 and a gaseous atmosphere 12 above the liquid. The liquid may, for example, be a liquified gas, a liquid petroleum product, or a hazardous chemical liquid. The tank may be land-based or installed in a vessel, such as a tanker or another kind of ship, not shown. In the latter case a top wall 13 of the tank 10 may form part of the deck of the ship.

The gaseous atmosphere defined between the upper level of the liquid 11 and the top wall 13 may be air and/or vapour of the liquid 11 and/or an inert gas, such as nitrogen, or a gas which has been combusted. The atmosphere 12 may have a pressure which is slightly higher than the atmospheric pressure, typically less than 0.1 bar above the atmospheric pressure.

A well or cofferdam 14 extends downwardly from the deck 13 into the tank 10. An electric motor 15 having an explosion proof housing 16 made in accordance with the standard EN50018 is arranged within the well 14 such that an outer space 17 surrounding the motor housing 16 is defined between the housing 16 and the adjacent walls of the well 14. The motor housing 16 defines an inner space 18 in which the electric motor 15 is arranged. A pump, such as a centrifugal pump 19, which is arranged below the well or cofferdam 14, has a suction inlet 20 and a discharge tube 21 extending out from the tank. The inlet 20 may be positioned in a depression 22 formed in the bottom of the tank 10.

The electric motor 15 is connected to the pump 19 by means of a driving shaft 23. A separate sealing chamber 24 surrounds the shaft 23 such that the top wall 25 of the sealing chamber coincides with the bottom wall of the well or cofferdam 14. The shaft 23 extends through aligned openings defined in the top wall 25 and the bottom wall 26, respectively, of the sealing chamber 24. The sealing chamber 24 contains a pair of annular seals 27 and 28, which may be of the type marketed by John Crane International. The primary seal 27 seals the space between the shaft 23 and the rim defining the opening in the sealing chamber bottom wall 26, while the secondary seal 28 is sealing the space defined between the shaft 23 and the rim of the opening defined in the sealing chamber top wall 25.

The opening in the sealing chamber top wall 25 is interconnected with an opening defined in the bottom wall of the motor housing 16 by means of a connecting tube 29, which may contain a shaft bearing 30. An opening 31 defined in the top wall of the motor housing connects the inner space 18 of the motor housing with an upwardly extending gas flow passage 32. A power supply cable 33 extends from the electric motor 15, via the opening 31 upwardly through the passage 32 to terminals 34 located above the deck or top wall 13. The upper end of the passage 32 is connected to the outer space 17 via a gas outlet 35 which is positioned above the upper level of the liquid 11 in the tank 10 and above the deck or top wall 13 and which is monitored by a one-way valve 36 allowing gas to flow only from the passage 32 into the outer space 17.

The electric motor 15 is provided with a cooling system or cooling circuit 37 including a heat transferring liquid, which may, for example, be a mixture of water and glycol. The cooling circuit comprises a cooling jacket 38 formed in the motor housing 16 and an air cooled heat exchanger 39 which is positioned above the top wall or deck 13. The cooling jacket 38 and the heat exchanger 39 are interconnected by pipes 40, so that the heat transferring liquid may circulate within the cooling circuit without using mechanical means for forced circulation The cooling circuit 37, which is a closed system completely separated from the liquid 11 in the tank 10, prevents excessive heating of the electric motor 15.

Protective gas, such as nitrogen or another inert gas, or a combusted gas, which is low in oxygen, such as exhaust gas from an internal combustion engine is supplied to the pumping system from a suitable source (not shown) via a gas supply pipe 41. The supply pipe 41 is connected to a purging pipe 42 which is monitored by a closure valve 43. A gas feeding pipe 44, which is connected to the supply pipe 41 and opens into the sealing chamber 24 contains an adjustable throttling valve 45, which causes a pressure drop in the feeding pipe 44 depending on the volume flow therethrough. The maximum gas pressure within the feeding pipe 44 is monitored by a pressure switch 46, which ensures that the pressure of the gas supplied does not exceed a predetermined maximum, for example at a pressure exceeding the static pressure of the liquid 11 in the tank 10 by 3 bars. Because of the flow dependent pressure drop across the throttling valve 45 an excessive gas volume flow rate, for example due to defective seals 27 and 28, broken or leaking pipes, etc., may be detected. As an example an alarm may be activated if the gas consumption exceeds ten times the normal consumption.

Small amounts of the protective gas supplied to the sealing chamber 24 may flow through or past the seals 27 and 28 into the inner space of the tank 10 and into the connecting tube 29, respectively. The gas flowing through the seals "lubricates" and cools these seals, whereby their operative life-time is considerably prolonged. The gas pressure within the sealing chamber 24 preferably exceeds the static pressure of the adjacent liquid 11 in the tank 10 by 1–2 bars. The small amount of gas flowing through the seal 27 and into the tank 10 is collected in the atmosphere 12 above the liquid level. The gas flowing through the upper seal 28 is via the connecting tube 29 fed into an enclosure constituted by the connecting tube 29, the inner space 18 of the motor housing 16, and the gas flow passage 32 which are mutually interconnected. Liquid 11 from the tank 10, which might penetrate into the outer space 17 through a leakage in the wall of the well 14, cannot penetrate further into this sealed inner enclosure. Because of a substantial pressure drop across the seal 28, the gas pressure within the enclosure comprising the tube 29, the inner space 18, and the gas flow passage 32 may be maintained at a pressure level which is substantially lower than the pressure within the sealing chamber 24.

When gas is fed into the inner space 18 and into the gas flow passage 32, a similar gas flow may pass through the one-way valve 36 into the outer space 17. The one-way valve 36 opens only when the gas pressure within the inner space 18 and the gas flow passage 32 exceeds the gas pressure within the outer space 17 by a predetermined value. It is thereby ensured that the pressure in the inner space 18 and in the passage 32 is maintained at a higher level than in the outer space 17. Gas may flow from the lower part of the outer space 17 into the atmosphere via a riser tube 47 extending from the lower part of the well 14 upwardly through the outer space 17 to a position above the deck 13, where the riser tube extends through the wall of the well. The outer part of the riser tube 47 includes a liquid separator 48 and a pressure relief valve 49. The gas pressure within the outer space 17 is monitored by a pair of pressure switches 50 and 51, which are mounted above the deck or tank top wall 13 and connected directly to the outer space 17. The pressure switch 50 may be adapted to generate a signal, which is transmitted to a control circuit (FIG. 3) if a predetermined maximum pressure value within the outer space 17 is exceeded. Similarly, the pressure switch 51 is adapted to generate a signal, which is transmitted to the control circuit for controlling the electric motor 15, when the pressure within the outer space 17 decreases below a predetermined minimum pressure value. As an example, the pressure of the gaseous atmosphere 12 may be 0–0.2 bar above atmospheric pressure. The pressure switch 50 may then generate a signal when the gas pressure within the outer space 17 exceeds the atmospheric pressure by 0.93 bar, while the pressure switch 51 may generate a signal when the pressure in the outer space has been reduced to 0.25 bar above atmospheric pressure. The relief valve or the excess pressure valve 49 may open when the gas pressure in the outer space 17 increases to a value of 0.78 bar above atmospheric pressure.

The relief valve 49 automatically releases gas from the outer space 17 when a predetermined maximum pressure value is exceeded. This predetermined value is chosen a little above the pressure value desired within the outer space 17 and preferably at a value between the pressure values at which the pressure switches 50 and 51 are activated. This means, that during normal operation the pressure within the outer space 17 is monitored by the relief valve 49, while protective gas is constantly supplied from the inner space 18 of the motor housing.

Before the electric motor 15 is started, the gas flow passage 32 and the outer space 17 may be purged or flushed with protective gas. This may be obtained by opening the closure valve 43, whereby protective gas is supplied to the lower part or the gas flow passage 32. The valve 43 may be opened manually or the operation of the valve may be controlled by the control circuit and opened automatically.

In the embodiment shown in FIG. 1 the sealing chamber 24, the inner space 18 of the motor housing 16, the gas flow passage 32, and the outer space 17 are connected in series. It should be understood that protective gas could be supplied separately to any of these spaces. Thus, some of them or all of them could be connected in parallel. As an example, the supply pipe 41 could be connected directly to the outer space 17 by a separate pipe which could be provided with a flow control device, such as a throttling valve.

FIG. 2 shows a modified embodiment of the pumping system, and in FIGS. 1 and 2 corresponding parts have been designated by the same reference numerals.

In the embodiment shown in FIG. 2 the gas feeding pipe 44 contains a one-way valve 52 and is connected directly to the upper part of the inner space 18 of the motor housing 16 so that protective gas is fed directly into the inner space of the motor housing and not into the sealing chamber 24 as shown in FIG. 1. However, the inner space 18 is interconnected with the sealing chamber 24 by means of a connecting pipe 53 having a one-way valve 54 allowing gas to flow from the inner space 18 of the motor housing into the sealing chamber 24, only.

In the embodiment shown in FIG. 2 the flow opening 31 interconnecting the inner space 18 and the gas flow passage 32 has been reduced so as to fit the dimension of the cable 33 passing therethrough. This means that only an insignificant amount of gas may pass from the inner space 18 of the motor into the flow passage 32. However, the closure valve 43 is by-passed by a by-pass pipe 55, which includes an adjustable throttling valve 56. This means that the outer space 17 is connected to the feeding tube 41 via the by-pass pipe 55, the purging pipe 42, the gas flow passage 32, and the gas outlet 35 in parallel with the gas feeding pipe 44, which is connected to the inner space 18 and with the sealing chamber 24 via the connecting pipe 53.

In the embodiment shown in FIG. 2 fresh protective gas is supplied directly to the inner space 18 via the gas feeding pipe 44 and to the gas flow passage 32 via the purging pipe 42 so that these spaces will contain fresh protective gas at a pressure which is higher than the gas pressure within the outer space 17. The pressure within the inner space 18 of the motor housing 16 is higher than the pressure within the sealing chamber 24. The pressure difference is determined by the pressure difference (for example 0.02–0.5 bar) at which the one-way valve 54 opens, and by the gas flow resistance past the annular seal 28. The pressure within the inner space 18 of the motor housing and within the gas flow passage 32 may for example be 1.5–3 bars above the surrounding static liquid pressure in the tank 10.

The inner space 18 of the motor housing may serve as a gas reservoir. If the supply of protective gas is terminated for some reason or another, the amount of protective gas under superatmospheric pressure within the inner space 18 may ensure the lubricating and cooling gas flow through the seals 27 and 28 for a certain period of time. If the volume of the inner space 18 is 20 liters and the consumption of protective gas, which depends on i.a. the condition of the annular seals, is 0.3 liters/min., the operation of the pumping system may continue in about an hour with continuing lubricating and cooling gas flows through the annular seals 27 and 28.

FIG. 3 diagrammatically illustrates how the operation of the pumping systems shown in FIGS. 1 and 2 may be monitored by means of an electronic control system or control unit 57. As shown in FIG. 3 the control unit 57 may communicate with the closure valve 43, the pressure switches 50 and 51, a power supply switch 58 controlling power supply to the motor 15 and with a surveying and operating panel 59.

When the control circuit receives a signal from the pressure switch 51 indicating that the pressure within the outer space 17 is below the predetermined minimum level, an alarm condition is indicated on the panel 59. At the same time the control unit 57 opens the switch 58 to switch off the power supply to the electric motor 15. As the alarm condition is caused by a too low pressure within the outer space 17 a control unit can be reset to its normal condition only when the pressure has been increased to its normal level and when the outer space 17 and the inner space 18 of the motor housing has been flushed with protective gas. In order to ensure that these conditions are fulfilled, the power supply to the electric motor 15 is not reestablished by closing the switch 58 until the control unit 57 has received a signal from the pressure switch 50 during a certain predetermined period of time indicating that the pressure has exceeded the predetermined maximum value. This means, that the gas pressure in the outer space 17 has been at a high level in a time period, which is sufficiently long to ensure effective purging or flushing of the system. The control unit 57 may cause the valve 43 to open to cause such purging. The valve 43 may, however, also be opened manually by the operator.

Another dangerous situation may occur if a leakage appears in the well or cofferdam 14 so that liquid 11 from the tank 10 penetrates into the outer space 17. Even if the liquid generates inflammable vapours this will not involve any immediate risk, because such vapours cannot penetrate into the inner space 18 of the electric motor 15, where the gas pressure is higher. However, the liquid level within the outer space 17 may eventually rise and close the opening of the riser tube 47. Thereafter, the gas within the outer space 17 can no longer escape through the pressure relief valve 49, and therefore the pressure within the space 17 will increase, partly because protective gas is still being supplied via the annular seal 28 or via the purging pipe 42, and partly because the gas-filled volume of the outer space 17 is decreasing. For that reason the predetermined maximum pressure value at which the pressure switch 50 is being activated is reached. Consequently, the pressure switch 50 generates a signal which is transmitted to the control unit 57, whereby the alarm condition is activated. Such alarm condition does not only mean that a visual and/or auditive alarm is activated via the panel 59, but also that the power supply to the electric motor 15 is terminated. Thereafter a manual or automatic opening of the valve 43 may take place in a manner as described above so that pressurized protective gas is supplied to the gas flow passage 32. Because of the high pressure of the gas supplied the liquid may be blown out through the riser tube 47.

The control unit 57 may also receive signals from temperature sensors arranged at various positions of the motor 15 as indicated by a dotted line 60 in FIG. 3. In case the temperature of the motor exceeds a predetermined value this may also cause a state of alarm.

The pumping system according to the invention may be provided with other kinds of seals than those described above, for example usual liquid-lubricated seals.

Even if the housing 16 of the electric motor 15 has not been made explosion proof, several errors in the security system should occur at the same time before a risk of explosion would exist, which is extremely unlikely.

I claim:

1. A safety pumping system, which includes a pump and an electric motor, and which is adapted to be immersed in a fluid contained in a tank, said system comprising:

a motor housing defining an inner space containing the electric motor, an outer shell or jacket defining an outer space surrounding the housing of the motor, a driving shaft interconnecting the electric motor and the pump, first gas supply means for supplying protective gas into the outer space at a pressure exceeding the atmospheric pressure, so as to fill the outer space with such gas, and second gas supply means for supplying protective gas into the inner space of the motor housing so as to displace oxygen therefrom and fill the space with protective gas in order to counteract explosions, the second gas supply means being adapted to maintain the protective gas in the inner space at a pressure which is equal to or exceeds that of the gas pressure in the outer space.

2. A system according to claim 1, wherein the first gas supply means is adapted to maintain the protective gas in the outer space at a pressure exceeding the pressure of a gas phase in the tank.

3. A system according to claim 1, wherein the outer shell or jacket defines a separate sealing chamber located between said outer space and the fluid contained in the tank, the driving shaft extending through aligned openings formed in opposite shell wall parts defining the sealing chamber, and third gas supply means being provided for supplying protective gas to the sealing chamber so as to maintain a pressure therein exceeding the pressure of the fluid in the adjacent part of the tank.

4. A system according to claim 3, wherein the sealing chamber contains sealing means surrounding the shaft for sealing at least one of the openings through which the driving shaft extends outwardly from the outer space.

5. A system according to claim 1, wherein the first gas supply means comprises said second gas supply means, the protective gas being supplied to said outer space via the inner space of the motor housing.

6. A system according to claim 5, wherein the second gas supply means further comprises said third gas supply means, the protective gas being supplied to said inner space via the sealing chamber.

7. A system according to claim 5, wherein the third gas supply means comprises said second gas supply means, the protective gas being supplied to the sealing chamber via said inner space of the motor housing.

8. A system according to claim 5, further comprising a one-way valve interconnecting said second and first gas supply means and allowing the protective gas to flow from the inner space into the outer space only.

9. A system according to claim 7, further comprising a one-way valve interconnecting said second and third gas supply means and allowing protective gas to flow from the inner space into the sealing chamber only.

10. A system according to claim 1, further comprising a control circuit for controlling the operation of the electric motor.

11. A system according to claim 10, further comprising means for sensing the volume flow of protective gas being supplied to any of the inner and outer spaces or to the sealing chamber and for causing the control circuit to activate an alarm and/or to interrupt the power supply to the electric motor when said gas volume flow exceeds a predetermined limit.

12. A system according to claim 1, wherein the first gas supply means is adapted to supply protective gas to said outer space at a pressure exceeding the atmospheric pressure by less than one bar.

13. A system according to claim 1, wherein the motor housing has a gas inlet and a gas outlet, the gas inlet being connected to a gas-lubricated mechanical seal arranged on the driving shaft in a sealing chamber separated from said outer space, means being provided for supplying protective gas to the sealing chamber at a pressure exceeding the atmospheric pressure and being equal to or greater than the superatmospheric pressure in said outer space.

14. A system according to claim 13, wherein the pressure of the protective gas in the sealing chamber is more than one bar.

15. A system according to claim 13, wherein a further gas-lubricated mechanical seal is arranged around the driving shaft, where the shaft extends through a sealing chamber wall into the space of the tank, protective gas at superatmospheric pressure being supplied to said further seal from said sealing chamber.

16. A system according to claim 13, wherein said outer space extends above the upper level of the fluid of said tank, the gas outlet of the motor housing being connected to said outer space above said upper level via a passage.

17. A system according to claim 16, wherein a power supply cable for the electric motor extends through said passage, which is gas tight.

18. A system according to claim 1, further comprising a liquid cooling system including a heat exchanger arranged outside the tank.

19. A system according to claim 18, where the liquid is circulated within the cooling system by differences in the specific gravity of the liquid caused by thermal differences.

20. A system according to claim 18, wherein the cooling system comprises a cooling jacket formed by the motor housing.

21. A system according to claim 10, wherein any said pressure exceeding the atmospheric pressure is maintained within a predetermined range between minimum and maximum values by a pair of pressure switches, which are adapted to output a signal to the control circuit when said pressure decreases below the minimum pressure and exceeds the maximum pressure, respectively.

22. A system according to claim 21, further comprising gas inlet means for supplying protective gas into the inner space of the motor housing at a superatmospheric pressure exceeding said maximum pressure.

23. A system according to claim 1, further comprising a riser tube opening into said outer space at a level below the electric motor and extending upwardly therefrom to a pressure relief valve positioned above the upper level of the fluid in the tank.

24. A system according to claim 21, wherein the control circuit, when receiving a signal from one of the pressure switches indicating that the pressure in said outer space exceeds said maximum pressure, shifts into an alarm mode, which may be terminated only when protective gas at a pressure exceeding said maximum pressure has been supplied directly to the outer space or to the inner space of the motor housing.

25. A system according to claim 21, wherein said maximum pressure is within the range of 0.25–0.4 bar above atmospheric pressure.

26. A system according to claim 21, wherein said minimum pressure is at least 0.1 bar.

27. A system according to claim 21, wherein the control circuit shifts into an alarm mode, in which the power supply to the electric motor is interrupted when receiving a signal from one of the pressure switches indicating that the pressure in said outer space is lower than said minimum pressure, the alarm mode being terminated only when the control circuit has for a predetermined period of time constantly received a signal from the other of said pressure switches indicating that the pressure in said outer space exceeds said maximum value.

28. A system according to claim 1, wherein the protective gas is one of: nitrogen, gas which has been combusted, or another gas low in oxygen.

29. A system according to claim 12, wherein said first gas supply means is adapted to supply protective gas to said outer space at a pressure exceeding the atmospheric pressure by less than 0.4 bar.

30. A system according to claim 14, wherein the pressure of the protective gas in the sealing chamber is 2–5 bars above the atmospheric pressure.

31. A system according to claim 26 wherein said minimum pressure is at least 0.2 bar above atmospheric pressure.

* * * * *